US 8,844,059 B1
Sep. 23, 2014

(12) United States Patent
Manmohan

(54) METHOD AND APPARATUS FOR PREVENTING DATA LOSS THROUGH SCREEN CAPTURE

(75) Inventor: Sarin Sumit Manmohan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 120 days.

(21) Appl. No.: 13/028,124

(22) Filed: Feb. 15, 2011

(51) Int. Cl.
G06F 7/04 (2006.01)

(52) U.S. Cl.
USPC .............. 726/32; 726/26; 726/27; 726/28; 726/29; 726/30; 726/31

(58) Field of Classification Search
USPC ................................. 726/26–32
See application file for complete search history.

(56) References Cited

U.S. PATENT DOCUMENTS

| 8,312,282 B2* | 11/2012 | Kawara | 713/176 |
| 8,438,630 B1* | 5/2013 | Clifford | 726/13 |
| 2005/0066165 A1* | 3/2005 | Peled et al. | 713/165 |
| 2005/0204130 A1* | 9/2005 | Harris | 713/165 |
| 2005/0229258 A1* | 10/2005 | Pigin | 726/27 |
| 2009/0290190 A1* | 11/2009 | Torii | 358/1.15 |
| 2011/0116131 A1* | 5/2011 | Mitsui | 358/1.15 |
| 2011/0179352 A1* | 7/2011 | Treadwell et al. | 715/255 |
| 2011/0239306 A1* | 9/2011 | Avni et al. | 726/26 |

OTHER PUBLICATIONS

Pavlo et al., Prohibiting Copying Screen Algorithm for Content Security Protection, Perspective Technologies and Methods in MEMS Design (MEMSTECH), 2010 Proceedings of VIth International Conference on, pp. 56-57.*
Hussain et al., Preventing the capture of sensitive information, ACM Southeast Conference, Mar. 18-20, 2005, pp. 154-159.*

* cited by examiner

Primary Examiner — Andrew Nalven
Assistant Examiner — Roderick Tolentino
(74) Attorney, Agent, or Firm — Lowenstein Sandler LLP

(57) ABSTRACT

A computing device detects a command to perform a print screen operation. On detecting the command to perform the print screen operation, the computing device identifies a file associated with a displayed application window. The computing device determines whether the file contains confidential information. Upon determining that the file contains confidential information, the computing device performs an action to enforce a data loss prevention policy.

21 Claims, 7 Drawing Sheets

METHOD AND APPARATUS FOR PREVENTING DATA LOSS THROUGH SCREEN CAPTURE

FIELD OF INVENTION

Embodiments of the present invention relate to the field of data loss prevention, and more particularly, to preventing the loss of data caused by a print screen operation.

BACKGROUND OF THE INVENTION

Employees of a modern organization often have access to files including information concerning various significant business aspects of the organization. This information may include data on customers (or patients), contracts, deliveries, supplies, employees, manufacturing, or the like. To protect such data, most organizations employ security systems that provide data loss prevention. Conventional security techniques typically scan textual data as it is leaving an endpoint system, and perform predetermined actions based on data loss prevention (DLP) policies to prevent loss of sensitive information. However, conventional security systems are not capable of determining whether or not confidential data is being displayed on an endpoint device. Moreover, conventional security systems are incapable of blocking a print screen operation when confidential data is displayed. Instead, conventional security systems simply block all print screen operations if a specific application is running, regardless of whether or not confidential information is displayed. This can unnecessarily inconvenience users who wish to take a screen shot when there is no confidential information shown.

SUMMARY OF THE INVENTION

In a data loss prevention system, a computing apparatus executes a data loss prevention (DLP) agent that detects a command to perform a print screen operation. On detecting the command to perform the print screen operation, the DLP agent identifies a file associated with a displayed application window. The DLP agent determines whether the file contains confidential information. Upon determining that the file contains confidential information, the DLP agent performs an action to enforce a data loss prevention policy. In one embodiment, performing the action comprises preventing the print screen operation.

In one embodiment, to identify the file associated with the displayed application window, the DLP agent identifies a title of the displayed application window and a process associated with the displayed application window. The DLP agent additionally scans a handle table of the process to identify file names of files currently open for the process. The DLP agent compares the title of the displayed application window to the file names to determine which of the files is associated with the displayed application window. In one embodiment, when processes perform close file operations, the DLP agent records file names of the closed files. If no match is found between the title of the displayed application window and the file names of the open files, the DLP agent may compare the title of the displayed application window to the file names of the closed files to determine whether any of the closed files is associated with the displayed application window.

In one embodiment, the displayed application window is one of a plurality of open application windows. For each open application window that meets a criterion, the DLP agent may determine whether the open application window is visible on a display. If the open application window is visible on the display, the DLP agent may identify an additional file associated with the open application window and determine whether the additional file associated with the open application window contains confidential information. In one embodiment, the plurality of open application windows are ordered from front to back, and the criterion is satisfied if any previous open application window in the order is not maximized.

In one embodiment, the DLP agent determines that a time limit has expired before determining whether the file contains confidential information. The DLP agent may permit the print screen operation to be performed upon expiration of the time limit. If it is later determined that the file contains confidential information, the DLP agent may update clipboard information to identify a screen shot generated by the print screen operation as containing confidential information and prevent the screen shot from being pasted to a document.

In one embodiment, a computer readable medium includes instructions that will cause a processor that executes the instructions to detect a print screen operation. The instructions cause the processor to identify a process associated with the displayed application window. The instructions cause the processor to scan a handle table of the process to identify file names of files currently open for the process. The instructions further cause the processor to compare the title of the displayed application window to the file names to determine which of the files is associated with the displayed application window.

In one embodiment a method for protecting data includes detecting a command to perform a print screen operation, identifying a file associated with a displayed application window, determining whether the file contains confidential information, and upon determining that the file contains confidential information, performing an action to enforce a data loss prevention policy.

BRIEF DESCRIPTION OF THE DRAWINGS

The present invention will be understood more fully from the detailed description given below and from the accompanying drawings of various embodiments of the invention.

DETAILED DESCRIPTION OF THE PRESENT INVENTION

A system and method for preventing data loss via a print screen operation are described. In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "detecting", "calculating", "determining", "identifying," "performing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Figure 1:
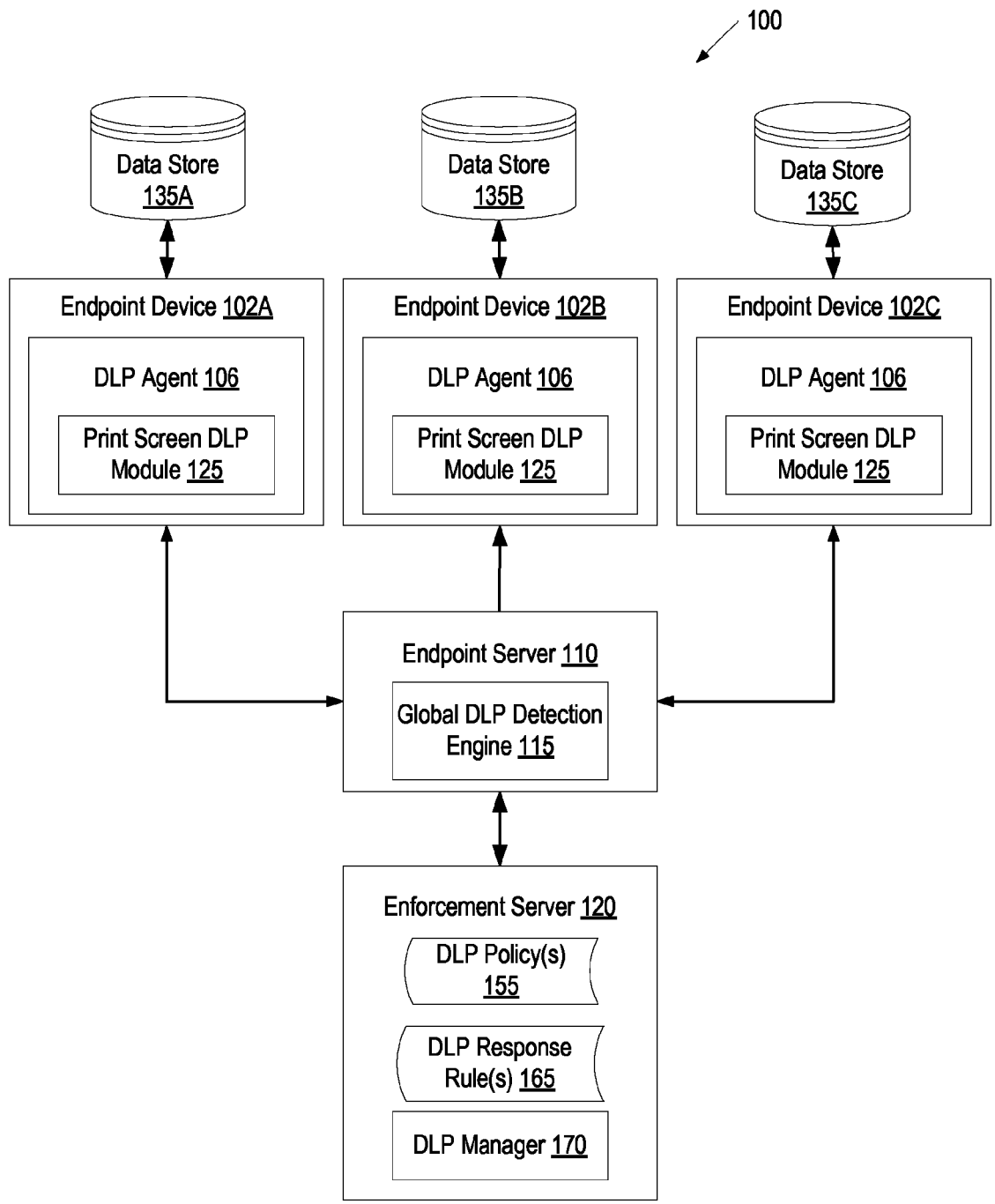
FIG. 1 illustrates an exemplary system architecture, in accordance with one embodiment of the present invention.

FIG. 1 illustrates an exemplary system architecture 100, in accordance with one embodiment of the present invention. The system architecture 100 includes multiple endpoint devices 102A-102C networked to an endpoint server 110, which in turn is networked to an enforcement server 120.

Each of the endpoint devices may be a personal computer (PC), a laptop, a mobile phone, a tablet computer, or any other computing device that can be accessed by a user. Each endpoint device 102A-102C has multiple different data loss vectors. Each data loss vector is a path through which data can be transferred off of the endpoint device. Examples of data loss vectors include burning files to an optical disc, copying data to a portable drive (e.g., a portable universal serial bus (USB) drive), printing data to a printer, sending data through a fax, sending an email, sending an instant message, performing a print screen operation, etc.

The endpoint devices 102A-102C each run an operating system (OS) that manages hardware and software of the endpoint devices. The OS may be, for example, Microsoft® Windows®, Linux®, Symbian®, Apple's® OS X®, Solaris®, etc. One or more applications run on top of the OS and perform various operations that involve accessing, moving, or otherwise manipulating data residing in a data store included in, attached directly to, or networked with the endpoint device. For example, the applications may include a CD or DVD burning application, an email application, a web browser, an instant messaging application, a printing application, a print screen function, an alt-print screen function, etc. In one embodiment, the applications perform the operations in response to receiving user instructions.

Each endpoint device 120A-102C may be connected to a data store 135A-135C, which may be a hard disk drive, tape backup, optical drive, volatile memory (e.g., random access memory (RAM)), or other storage device. Data stores 135A-135C may be internal to endpoint devices 102A-102C or external to endpoint devices 102A-102C. In one embodiment, the data stores 135A-135C may be combined into a network storage such as a storage area network (SAN) or network attached storage (NAS). In one embodiment, data stores 135A-135C may be combined into a network database such as a relational database. Data stores 135A-135C may contain data that includes sensitive information. The data may include files, tables, or other data formats. Examples of sensitive information include social security numbers, credit card numbers, bank account numbers, phone numbers, addresses, and so on.

Each endpoint device 102A-102C includes a DLP agent 106 that monitors data loss vectors to ensure that sensitive (e.g., confidential) information does not leave the endpoint device for illegitimate purposes. The DLP agent 106 may scan data as it moves through a data loss vector and/or when a request to send the data through a data loss vector is received. In one embodiment, the DLP agent 106 includes a print screen module 125. The print screen module 125 detects commands to perform print screen operations. This may include commands to perform a standard print screen operation (which generates a screen shot of an entire displayed desktop) as well as commands to perform an alt-print screen operation (which generates a screen shot of a selected or presently active application window). When a user requests a print screen operation, the print screen module 125 determines whether any confidential information will be captured via the print screen operation. If confidential information will be captured, then the print screen module 125 takes one or more actions based on a data loss prevention (DLP) policy. A DLP policy may specify, for example, the type of content to be monitored (e.g., messages, displayed data, stored documents, etc.), sensitive information (e.g., a keyword "confidential" or "sensitive", data resembling a social security number, etc.) that the content should be monitored for, and an action to be performed when sensitive information is detected in the content being monitored.

For some types of DLP detection techniques, DLP agent 125 sends data to endpoint server 110, and a global DLP detection engine 115 included in the endpoint server 110 determines whether the data includes confidential information. Once global DLP detection engine 115 determines whether a file or other data contains confidential information, endpoint server 110 sends a message back to the DLP agent 106 stating whether or not the data contains confidential information. The DLP agent 106 may then perform one or more actions to enforce a DLP policy if the data does contain confidential information.

In one embodiment, endpoint server 110 acts as an aggregator of data regarding violations of DLP policies (e.g., as an aggregator of incident reports). The endpoint server 110 may collect such data from each endpoint device 102A-102C, and report the collected data to enforcement server 120 for analysis.

Enforcement sever 120 manages DLP policies 155. In one embodiment, DLP manager 170 generates DLP policies 155 (e.g., based on administrator input). The DLP manager 170 may then propagate the DLP policies 155 to the endpoint server 110 and/or to the endpoint devices 102. DLP policies 155 may include criteria that may indicate an increased risk of data loss. A DLP policy 155 is violated if one or more criteria included in the DLP policy 155 are satisfied. Examples of criteria include user status (e.g., whether the user has access privileges to a file), file location (e.g., whether a file to be copied is stored in a confidential database), file contents (e.g., whether a file includes sensitive information), time (e.g., whether an operation is requested during normal business hours), data loss vector, application attempting the operation, and so on.

DLP policies may include policies for performing described content matching, exact data matching, and indexed document matching. Additionally, DLP policies may include group based detection rules. A described content matching DLP policy defines one or more key words and/or regular expressions to be searched for. For example, a described content matching DLP policy may define a social security number using a regular expression. Using a described content matching DLP policy, a DLP detection engine determines whether any information included in scanned data match the key words and/or regular expressions. If a match is found, then it may be determined that the data includes confidential information. In one embodiment, DLP agents 106 implement described content matching DLP policies. Therefore, DLP agents 106 may scan documents, files and other data to identify confidential information.

Exact data matching (EDM) may be used for protecting data that is typically in structured formats, such as database records. Indexed document matching (IDM) may be used to protect unstructured data, such as Microsoft® Word or PowerPoint® documents, or CAD drawings. For both EDM and IDM, confidential data is first identified by an organization that wishes to protect the data and then fingerprinted for precise, ongoing detection. In one embodiment, the fingerprinting process includes accessing and extracting text and data, normalizing it, and securing it using a nonreversible hash. When data (e.g., a file) is to be scanned, a fingerprint (e.g., hash) is generated of that file or contents of that file and compared to stored fingerprints. If a match is found, then the scanned file is identified as a confidential file. In one embodiment, the endpoint server 110 implements EDM and/or IDM DLP policies. Therefore, the DLP agent 106 sends files to be scanned to the endpoint server 110. The endpoint server 110 then generates a fingerprint of the file and compares the fingerprint to stored fingerprints associated with known confidential files, and reports results back to the DLP agent 106.

A group based detection rule uses existing technologies, but allows policies to be configured based on user groups. For example, administrators may be allowed to send confidential data, and employees in a finance department may be allowed send financial related data to each other. When a user attempts to perform an operation on data, DLP agent 106 checks the user's identity and determines whether the user belongs to a particular group. The DLP agent 106 then checks whether the DLP policy allows members of that group to send the data.

Additionally, the DLP manager 170 may generate DLP response rules 165, which it may also propagate to the endpoint server 110 and/or to the endpoint devices 102. The DLP response rules 165 designate actions for endpoint devices and/or the endpoint server 110 to take when DLP policies are violated. Examples of actions that an endpoint device may take include sending a notification to an administrator, preventing the data from exiting the endpoint device 102A-102C through the data loss vector, locking down the endpoint device so that no data can be moved off of the endpoint device through any data loss vector, encrypting data as it is moved off the endpoint device, and so on.

Figure 2:
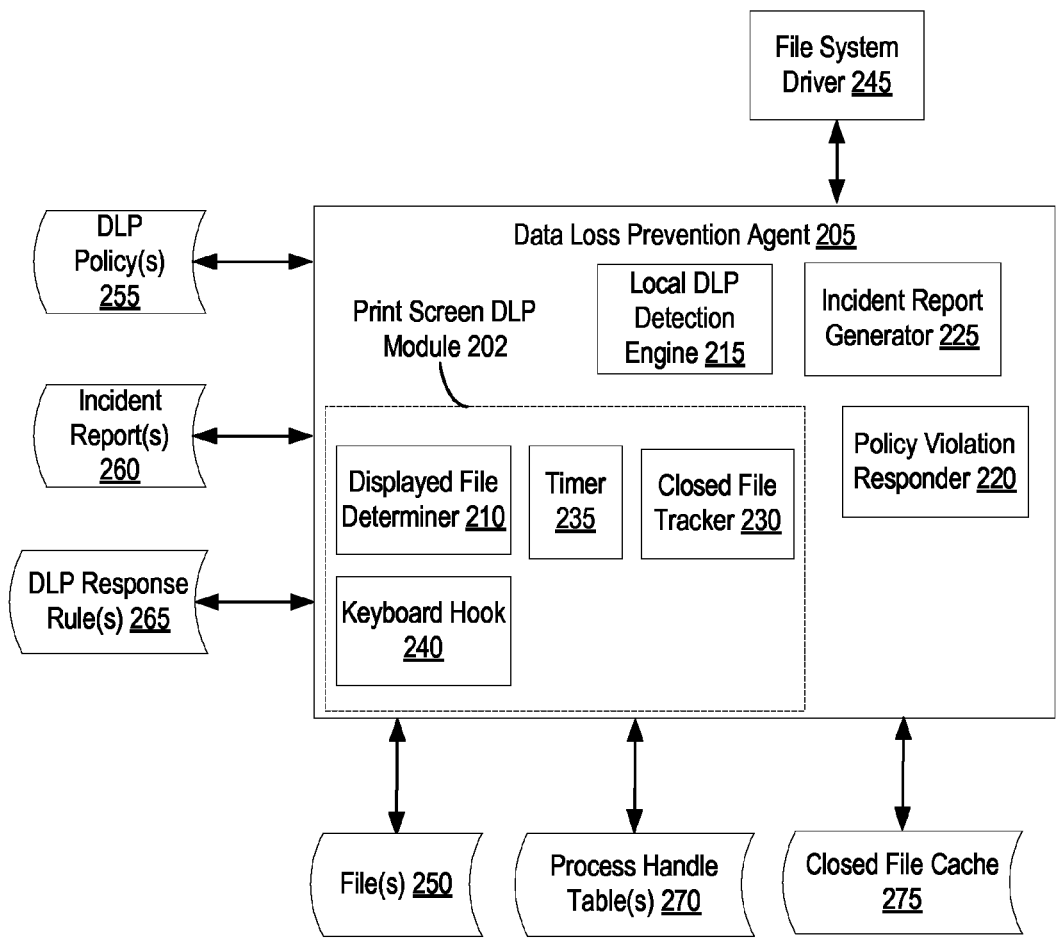
FIG. 2 is a block diagram of a data loss prevention agent, in accordance with one embodiment of the present invention.

FIG. 2 is a block diagram of a data loss prevention agent 205, in accordance with one embodiment of the present invention. The DLP agent 205 may include multiple different policy violation detectors, each of which may monitor different data loss vectors, applications, data, etc. to detect operations that attempt to move data off of an endpoint device. The user initiated operations may include, for example saving or accessing restricted database data on any storage device of the endpoint device, using restricted database data in an application, printing confidential data, using confidential data in a network communication protocol, etc.

One example of a policy violation detector is a print screen DLP module 202. The print screen DLP module 202 detects commands to perform a print screen operation and performs actions in response to detecting such commands. In one embodiment, the print screen DLP module 202 includes a keyboard hook 240, a displayed file determiner 210, a timer 235, and a closed file tracker 230.

Keyboard hook 240 is a driver or other module that intercepts keystrokes (e.g., from a keyboard). In one embodiment, the keyboard hook 240 is a user mode component (e.g., a component that runs in a non-privileged environment with restricted access to resources). Alternatively, the keyboard hook 240 may be a kernel mode component (e.g., a component that runs in a privileged environment with full access to resources). The keyboard hook 240 analyzes the intercepted keystrokes and determines whether they are keystrokes to initiate a print screen operation. For example, on a Windows based operating system, the keyboard hook 240 scans for a depression of a print screen key on a keyboard or depressions of an alt key and a print screen key on a keyboard. Alternatively, on an OS X based operating system, the keyboard hook 240 may scan for depression of the following key combinations: command-shift-4, command-shift-3, command-shift-4-space, command-shift-control-3 and command-shift-control-4.

When the keyboard hook 240 identifies a command to perform a print screen operation, it notifies displayed file determiner 210. Displayed file determiner 210 then identifies a file or files that have contents that will be captured in a screen shot. To identify a file that will have contents displayed in a screen shot, displayed file determiner 210 identifies a title of a displayed application window. The title of the displayed application window may be the title that appears in that window's title bar. The displayed file determiner 210 additionally identifies a process associated with the displayed application window using an application programming interface (API) provided by the operating system.

Once the process is identified, displayed file determiner 210 scans a handle table 270 for that process. Every process has a handle table. The handle table is a listing of all resources that are in use by the process. The handle table may include the handles of files that are currently open by the process, registry resources, synchronization objects, and other resources. The displayed file determiner 210 scans through all handles included in the handle table and determines which of the handles are for files. An API provided by the operation system may include functionality for distinguishing between handles for different types of data (e.g., between handles for files and handles for other types of data). The displayed file determiner 210 then resolves those file handles to complete file names, which may include file paths.

The displayed file determiner 210 performs a heuristic match between the file names for open files of the process and the identified window title. The window title may not be an exact match to the file name, but there are typically numerous similarities. Based on these similarities, the displayed file determiner 210 can determine with high accuracy which file is opened in which application window. For example, the window title could be "word-sumit financial data," and the file name could be "C:/my documents/sumit financial data.doc." The displayed file determiner 210 would determine that the window having the title "word-sumit financial data" is associated with the file having the file name "C:/my documents/sumit financial data.doc."

Some processes are designed to open a file, read the content, and then close the file. When such a process is to perform a save operation, the process reopens the file, saves it with the changes, then closes it again. Therefore, the file may be closed while the process is operating and/or displaying the contents of that file. Accordingly, when the displayed file determiner 210 scans the handle table, it won't find the file. To account for such processes, in one embodiment closed file tracker 230 records the file names of files when those files are closed.

In one embodiment, DLP agent 205 is connected with a file system driver 245. The file system driver 245 identifies the names of files as those files are opened and closed. In one embodiment, file system driver 245 is a kernel mode component. File system driver 245 reports the file names of closed files to closed file tracker 230. Closed file tracker 230 then records the names of the closed files in a closed file cache 275. In one embodiment, closed file tracker 230 keeps track of a set of files last closed for each process. The file names for these last closed files may be included in the closed file cache 275.

In one embodiment, when displayed file determiner 210 fails to find a match between a window title and an open file in a process's handle table 270, displayed file determiner 210 attempts to perform a heuristic match between the window title and file names of one or more files included in the closed file cache 275. In one embodiment, displayed file determiner 210 compares the window title to the file name for the last closed file for the identified process. If the window title matches a file name of a closed file, then displayed file determiner 210 identifies that closed file as being associated with the application window.

Displayed file determiner 210 may take different actions depending on whether the print screen command will generate a screen shot of an entire display or just of an active window. If the print screen command will generate a screen shot for only a single active application window (e.g., if an alt-print screen command is issued), then the displayed file determiner 210 may identify just the file associated with that one application window. However, if the print screen command will generate a screen shot for multiple active application windows, displayed file determiner 210 may determine files associated with multiple different application windows.

In one embodiment, when a screen shot will be taken of an entire display, the displayed file determiner 210 determines which application windows are not displayed, and then identifies files associated with all other application windows. In one embodiment, displayed file determiner 210 orders the application windows from front to back. Starting from the front application window, the displayed file determiner 210 then determines for each application window whether or not that application window has been maximized. If an application window has been maximized, then it can be guaranteed that any application windows behind that application window will not show up on a screen shot. Accordingly, the displayed file determiner 210 may not need to identify the files associated with any application window that is behind a maximized file window.

In another embodiment, displayed file determiner keeps track of the portions of the display that are occupied by each display window. Displayed file determiner 210 can then determine whether application windows are fully covered by one or more other application windows. For those application windows that are fully covered, displayed file determiner 210 may not need to determine files associated with those application windows. In one embodiment, displayed file determiner 210 maps each pixel of the display (e.g., of the desktop) to a particular application window. Those application windows that are not mapped to any portion of the display may be ignored for the purposes of DLP detection. Consider an example in which a first application window has a lower right corner at (0,0) and has a size of (500 pixels, 300 pixels), and a second application window has a lower right corner at (1,2) and a size of (200 pixels, 200 pixels). The second application window in this example is completely covered by the first application window. Therefore, the displayed file determiner 210 can determine that the second application window is not displaying any confidential information that would be included in a screen shot.

Once a displayed file is identified as being associated with a displayed application window, local DLP detection engine 215 executes one or more DLP policies to determine whether the file contains confidential information (e.g., using described content matching, exact data matching, indexed document matching, directory group matching, etc.). Additionally, the DLP agent 205 may send the file to an endpoint server so that the endpoint server can execute one or more additional DLP policies to determine whether the file contains confidential information. If the local DLP engine 215 or endpoint server determines that a requested operation to move data off of an endpoint device through a data loss vector does not satisfy the criteria of any DLP policy 255 (e.g., if data being captured in a print screen operation does not contain sensitive information), then no policy violation is detected and no action may be performed. If the local DLP detection engine 215 or endpoint server determines that the requested operation does satisfy the criteria of an active/enabled DLP policy (e.g., if an unauthorized user attempts to perform a print screen operation when confidential information is displayed), then a policy violation is detected and the local DLP detection engine 215 notifies the policy violation responder 220 and/or the incident report generator 225 of the policy violation.

Policy violation responder 220 applies one or more DLP response rules 265 when a DLP policy violation is detected. Each DLP response rule 265 may be associated with one or more DLP policies 255 and includes one or more actions for policy violation responder 220 to take in response to violation of an associated DLP policy 255. Once a violation of a DLP policy 255 is discovered, policy violation responder 220 may determine which DLP response rules are associated with the violated DLP policy 255. One or more actions included in the response rule 265 can then be performed. Examples of performed actions include sending a notification to an administrator, preventing the data from exiting an endpoint device through a data loss vector, locking down the computer so that no data can be moved off of the endpoint device through any data loss vector, encrypting data as it is moved off the endpoint device, and so on.

Incident report generator 225 may generate an incident report 260 noting the violated DLP policy 255 and the circumstances surrounding the violated DLP policy 255. Incident report generator 225 maintains a record of incident reports 260 of some or all policy violations that have occurred on an endpoint device and/or that have been attempted by a particular user. The user may be identified, for example, based on a user login. In addition to identifying the DLP policy that was violated, each incident report 260 may also indicate the circumstances of the policy violation. For example, the incident report 260 may identify an application, user, data loss vector, type of sensitive data (e.g., social security number, credit card number, etc.), etc. associated with the policy violation. The incident report generator 225 may also include a time stamp showing when the policy violation occurred.

In one embodiment, incident report generator 225 takes a screenshot of the display (e.g., of a displayed desktop) when a DLP policy is violated. Incident report generator 225 may then attach the screen shot to the incident report. Therefore, an administrator who views the incident report may see whether the incident was a false alarm or identify what confidential information a user was trying to capture.

In one embodiment, print screen DLP module 202 includes a timer 235. The timer may be configured to time out at 2 ms, 10 ms, 100 ms, 1 s, or at some other time interval. The timer 235 begins counting when a print screen command is detected. If the timer 235 times out before the DLP agent 205 has had a chance to check the files associated with all displayed application windows (e.g., before displayed file determiner 210 has identified files associated with all displayed application windows, before the local DLP detection engine 215 has scanned all the files, and/or before the endpoint server has scanned all files), then the DLP agent 205 permits the print screen operation, and a screen shot is taken and added to a operating system's clipboard. However, the displayed file determiner 210, local DLP detection engine 215 and/or endpoint server continue to identify and/or scan files after the print screen operation is performed. If the local DLP detection engine 215 and/or endpoint server later determine that any of the files contain confidential information, policy violation responder 220 then updates the clipboard information to identify the screen shot as containing confidential information. When the user attempts to perform a paste operation, policy violation responder 220 may then block that paste operation. Alternatively, the policy violation responder 220 may allow the screen shot to be pasted to a document, and may tag that document as containing confidential information. Therefore, if the user then attempts to perform an operation on that document, the local DLP detection engine 215 may detect a DLP policy violation, and the policy violation responder 220 may block the operation.

Figure 3:
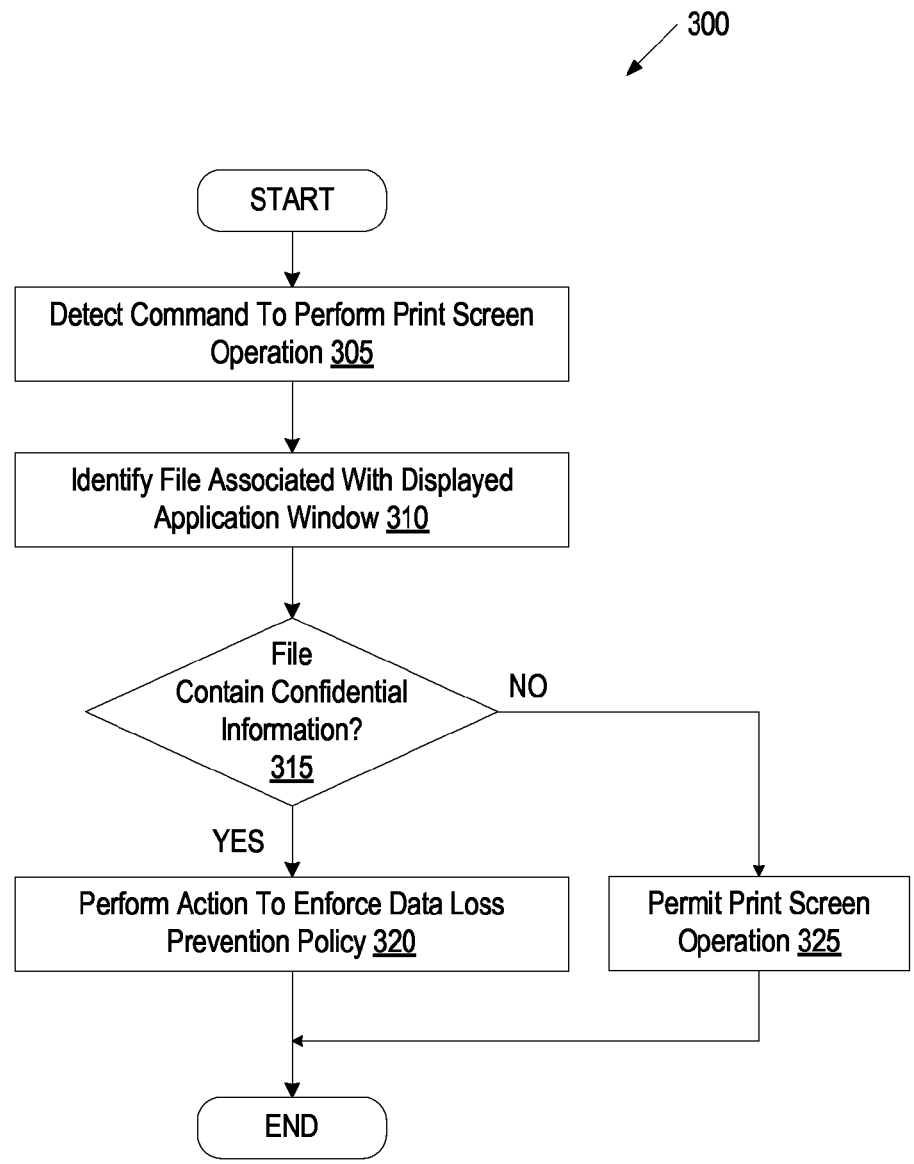
FIG. 3 is a flow diagram illustrating one embodiment for a method of protecting a computing device from data loss via a print screen operation.

FIG. 3 is a flow diagram illustrating one embodiment for a method 300 of protecting a computing device from data loss via a print screen operation. The method 300 is performed by processing logic that may comprise hardware (circuitry, dedicated logic, etc.), software (such as is run on a general purpose computer system or a dedicated machine), or a combination of both. Method 300 may be performed by a DLP agent such as DLP agent 106 running on endpoint device 102A of FIG. 1.

Referring to FIG. 3, at block 305 a DLP agent detects a command to perform a print screen operation. At block 310, the DLP agent identifies a file that is associated with a displayed application window. The DLP agent may also identify files that are associated with one or more additional displayed application windows.

At block 315, the DLP agent determines whether the file (or files) contains confidential information. If the file (or files) contains confidential information, then the method proceeds to block 320, and an action is performed to enforce a data loss prevention policy. For example, the print screen operation may be blocked. If the file (or files) does not contain any confidential information, then the DLP agent permits the print screen operation. The method then ends.

Figure 4:
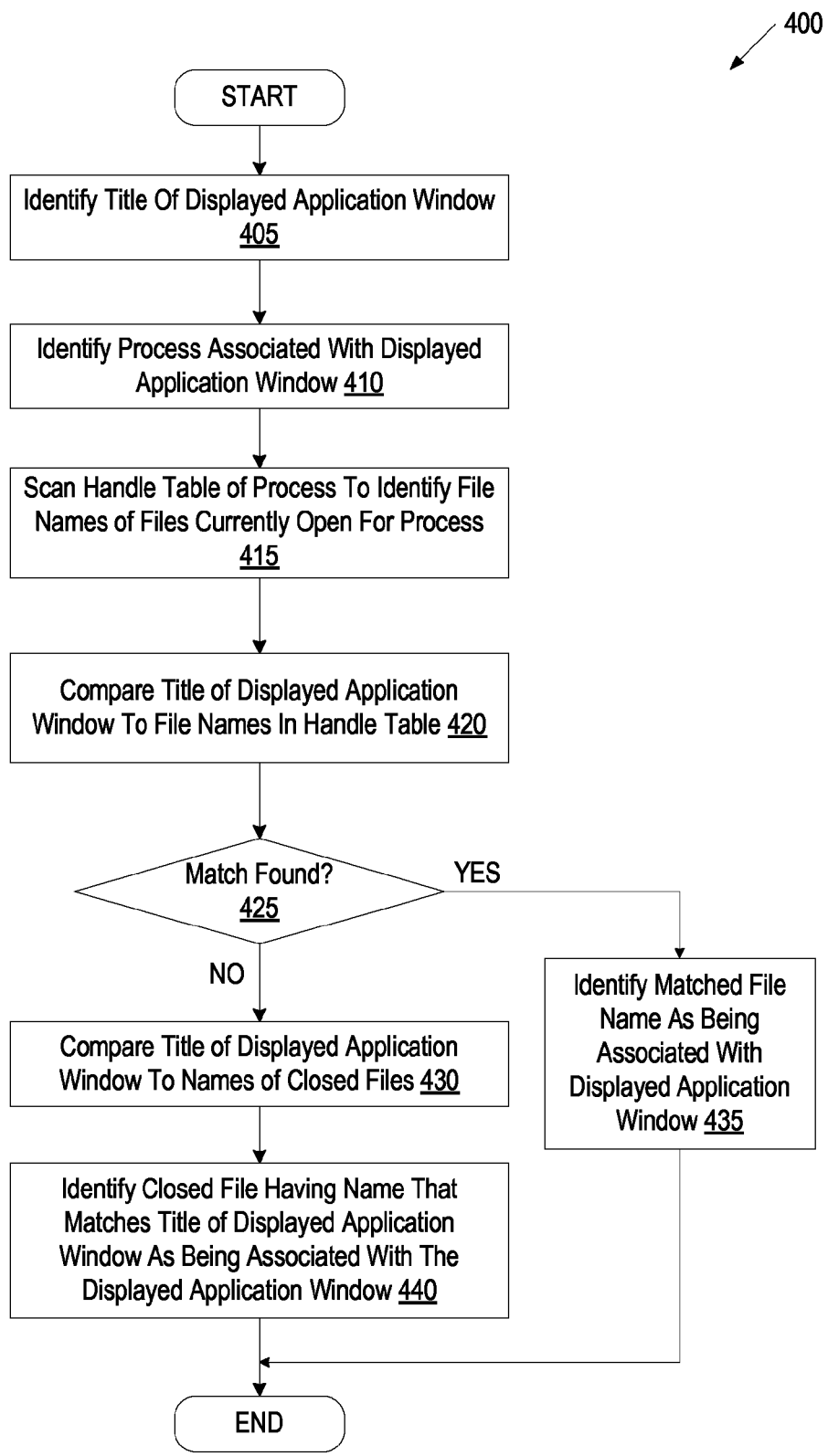
FIG. 4 is a flow diagram illustrating one embodiment for a method of determining a file that is associated with an application window.

FIG. 4 is a flow diagram illustrating one embodiment for a method 400 of determining a file that is associated with an application window. Method 400 is performed by processing logic that may comprise hardware (circuitry, dedicated logic, etc.), software (such as is run on a general purpose computer system or a dedicated machine), or a combination of both. Method 400 may be performed by a DLP agent such as DLP agent 106 running on endpoint device 102A of FIG. 1. In one embodiment, method 400 is performed at block 310 of method 300.

Referring to FIG. 4, at block 405 a DLP agent identifies a title of a displayed application window. The title may be associated with the application window, and may be easily identifiable. At block 410, the DLP agent identifies a process associated with the application window. This may be determined using an API provided by an operating system.

At block 415, the DLP agent scans a handle table of the process to identify file names of files that are currently open for the process. At block 420, the DLP agent compares the title of the displayed application window to the file names in the handle table. At block 425, if a match is found then the method continues to block 435. If no match is found, the method continues to block 430. A match may be a full match or a partial match, and may be made using one or more heuristic algorithms.

At block 435, the DLP agent identifies the matched file name as being associated with the displayed application window.

At block 430, the DLP agent compares the title of the displayed application window to names of closed files. In one embodiment, the DLP agent compares the title of the displayed application window to a set of files most recently closed by the process. At block 440, the DLP agent identifies a closed file having a name that matches the title of the displayed application window as being associated with the displayed application window. The method then ends.

Figure 5:
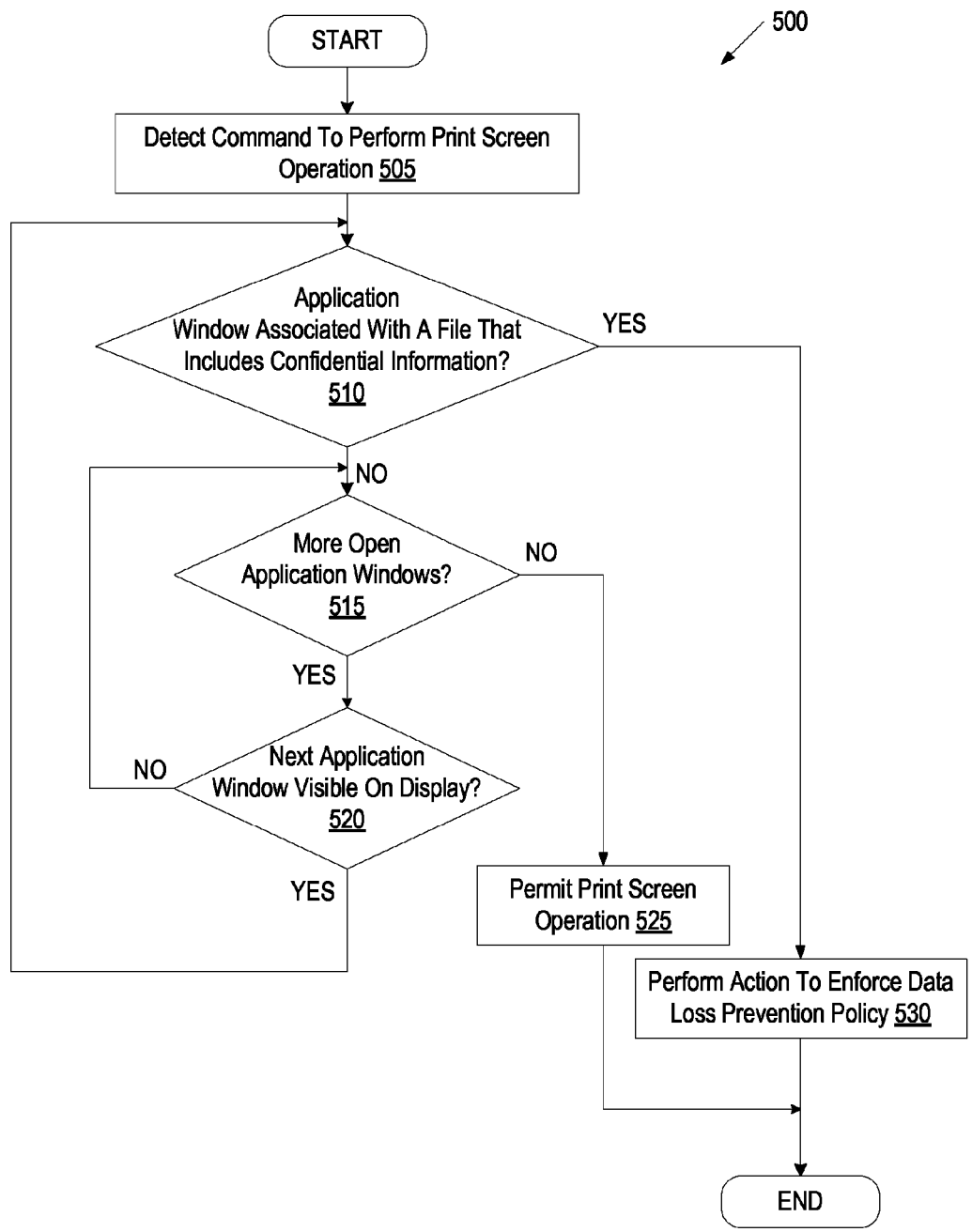
FIG. 5 is a flow diagram illustrating another embodiment for a method of protecting a computing device from data loss via a print screen operation.

FIG. 5 is a flow diagram illustrating another embodiment for a method 500 of protecting a computing device from data loss via a print screen operation. The method 500 is performed by processing logic that may comprise hardware (circuitry, dedicated logic, etc.), software (such as is run on a general purpose computer system or a dedicated machine), or a combination of both. Method 500 may be performed by a DLP agent such as DLP agent 106 running on endpoint device 102A of FIG. 1.

Referring to FIG. 5, at block 505 a DLP agent detects a command to perform a print screen operation. At block 510, the DLP agent determines whether a front most application window is associated with a file that includes confidential information. In one embodiment, the DLP agent first determines the file that is associated with the application window using method 400. Once the file is identified, the DLP agent scans the file using a DLP detection engine to determine whether the file violates any DLP policies. The DLP agent may also send the file to an endpoint server along with a request for the endpoint server to scan the file. If the file contains confidential information, then the method continues to block 530, and the DLP agent performs an action to enforce a data loss prevention policy. If the file does not contain any confidential information, then the method proceeds to block 515.

At block 515, the DLP agent determines whether there are any additional application windows open. If no additional application windows are open, then the method continues to block 525, and the DLP agent permits the print screen operation. If there are any additional application windows open, then the method continues to block 520. At block 520, the DLP agent determines whether the next application window is visible on a display, which will dictate whether the next application window will appear in a screen shot. If the next application window is not visible on the display, then the method returns to block 515 to check whether there are any other open application windows. If the next application window is visible on the display, then the method returns to block 510, and the DLP agent determines whether the next application window is associated with a file that includes confidential information.

Figure 6:
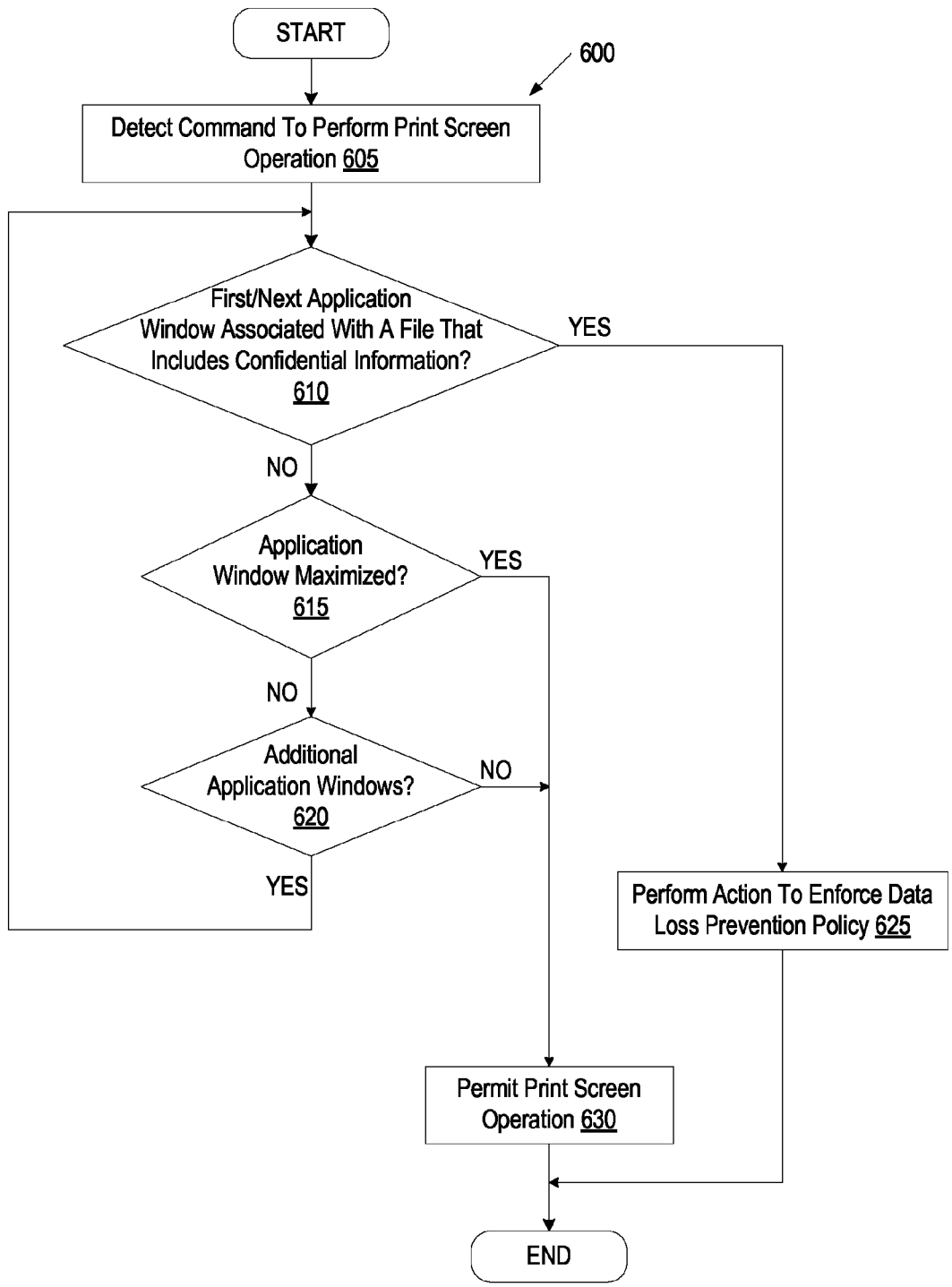
FIG. 6 is a flow diagram illustrating yet another embodiment for a method of protecting a computing device from data loss via a print screen operation.

FIG. 6 is a flow diagram illustrating yet another embodiment for a method 600 of protecting a computing device from data loss via a print screen operation. The method 600 is performed by processing logic that may comprise hardware (circuitry, dedicated logic, etc.), software (such as is run on a general purpose computer system or a dedicated machine), or a combination of both. Method 600 may be performed by a DLP agent such as DLP agent 106 running on endpoint device 102A of FIG. 1.

Referring to FIG. 6, at block 605 a DLP agent detects a command to perform a print screen operation. At block 610, the DLP agent determines whether a front most application window is associated with a file that includes confidential information. If the first application window is associated with a file that contains confidential information, then the method continues to block 625, and the DLP agent performs an action to enforce a data loss prevention policy. If the application window is not associated with a file that contains confidential information, then the method proceeds to block 615.

At block 615, the DLP agent determines whether the application window is maximized. If the application window is maximized, then it does not matter whether any additional application windows include confidential information because that confidential information will not be captured in a screen shot. Accordingly, if the application window is maximized, the method proceeds to block 630, and the DLP agent permits the print screen operation. If at block 615 the application window is not maximized, then the method continues to block 620.

At block 620, the DLP agent determines whether there are any additional open application windows. If there are any additional open application windows, then the method returns to block 610, and the DLP agent determines whether the next application window is associated with a file that contains confidential information. This process continues until a maximized application window is found or there are no additional open application windows. If at block 620 there are no additional open application windows, then the method proceeds to block 630.

Figure 7:
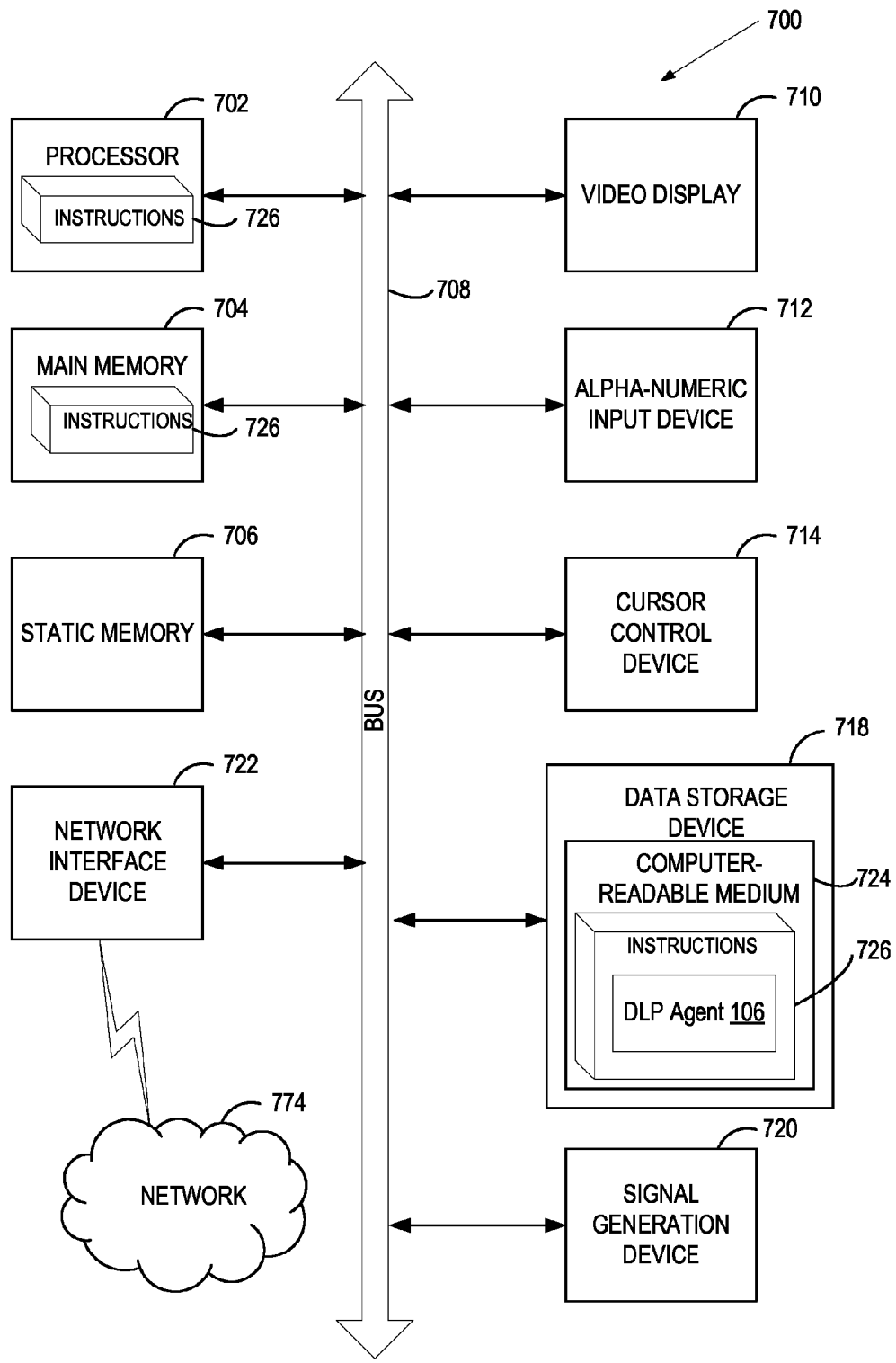
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 734 via the network interface device 722.

In one embodiment, the instructions 726 include instructions for a DLP agent that includes a print screen DLP module, such as DLP agent 205 of FIG. 2, and or a software library containing methods that call such a DLP agent. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A method comprising:
   detecting, by a processing device, a command to perform a print screen operation;
   identifying, by the processing device, a file associated with a displayed application window, the identifying comprising:
      scanning a handle table of a process associated with the displayed application window to identify file names of a plurality of files currently open for the process, wherein a first file of the plurality of files contains confidential information and a second file of the plurality of files does not contain the confidential information; and
      comparing a title of the displayed application window to the file names of the plurality of files to determine which of the plurality of files is associated with the displayed application window; and
   responsive to determining that the displayed application window is associated with the first file containing the confidential information, performing an action to enforce a data loss prevention policy.

2. The method of claim 1, wherein performing the action comprises preventing the print screen operation, the method further comprising:
   responsive to determining that the displayed application window is associated with the second file not containing the confidential information, performing the print screen operation.

3. The method of claim 1, further comprising:
   when processes perform close file operations, recording file names of closed files; and
   if no match is found between the title of the displayed application window and the file names of the open files, comparing the title of the displayed application window to the file names of the closed files to determine whether any of the closed files is associated with the displayed application window.

4. The method of claim 1, wherein the displayed application window is one of a plurality of open application windows, the method further comprising, for each open application window of the plurality of open application windows that meets a criterion:
   determining whether the open application window is visible on a display; and
   if the open application window is visible on the display, identifying an additional file associated with the open application window and determining whether the additional file associated with the open application window contains confidential information.

5. The method of claim 4, wherein the plurality of open application windows are ordered from front to back, and wherein the criterion is satisfied if any previous open application window in the order is not maximized.

6. The method of claim 1, wherein performing the action comprises:
   generating an incident report that identifies an attempt to copy confidential information;
   generating a screen shot; and
   attaching the screen shot to the incident report.

7. The method of claim 1, further comprising:
   determining that a time limit has expired before determining whether the file contains confidential information;
   permitting the print screen operation to be performed upon expiration of the time limit; and
   if it is later determined that the file contains confidential information, updating clipboard information to identify a screen shot generated by the print screen operation as containing confidential information and preventing the screen shot from being pasted to a document.

8. The method of claim 1, wherein:
   the handle table comprises a plurality of handles that include file handles and non-file resource handles;
   scanning the handle table of the process to identify the file names of the files currently open for the process comprises scanning the handle table to determine which of the plurality of handles are the file handles; and
   identifying the file associated with the displayed application window further comprises resolving the file handles to the names of the files currently open for the process after performing the scanning.

9. A non-transitory computer readable storage medium including instructions that, when executed by a processing device, cause the processing device to perform a method comprising:
   detecting, by the processing device, a command to perform a print screen operation;
   identifying, by the processing device, a file associated with a displayed application window, the identifying comprising:
      scanning a handle table of a process associated with the displayed application window to identify file names of a plurality of files currently open for the process, wherein a first file of the plurality of files contains confidential information and a second file of the plurality of files does not contain the confidential information; and
      comparing a title of the displayed application window to the file names of the plurality of files to determine which of the plurality of files is associated with the displayed application window; and
   responsive to determining that the displayed application window is associated with the first file containing the confidential information, performing an action to enforce a data loss prevention policy.

10. The non-transitory computer readable storage medium of claim 9, wherein performing the action comprises preventing the print screen operation, the method further comprising:
    responsive to determining that the displayed application window is associated with the second file not containing the confidential information, performing the print screen operation.

11. The non-transitory computer readable storage medium of claim 9, the method further comprising:
    when processes perform close file operations, recording file names of closed files; and
    if no match is found between the title of the displayed application window and the file names of the open files, comparing the title of the displayed application window to the file names of the closed files to determine whether any of the closed files is associated with the displayed application window.

12. The non-transitory computer readable storage medium of claim 9, wherein the displayed application window is one of a plurality of open application windows, the method further comprising, for each open application window of the plurality of open application windows that meets a criterion:

determining whether the open application window is visible on a display; and if the open application window is visible on the display, identifying an additional file associated with the open application window and determining whether the additional file associated with the open application window contains confidential information.

13. The non-transitory computer readable storage medium of claim 12, wherein the plurality of open application windows are ordered from front to back, and wherein the criterion is satisfied if any previous open application window in the order is not maximized.

14. The non-transitory computer readable storage medium of claim 9, wherein performing the action comprises:
generating an incident report that identifies an attempt to copy confidential information;
generating a screen shot; and
attaching the screen shot to the incident report.

15. The non-transitory computer readable storage medium of claim 9, the method further comprising:
determining that a time limit has expired before determining whether the file contains confidential information;
permitting the print screen operation to be performed upon expiration of the time limit; and
if it is later determined that the file contains confidential information, updating clipboard information to identify a screen shot generated by the print screen operation as containing confidential information and preventing the screen shot from being pasted to a document.

16. The non-transitory computer readable storage medium of claim 9, wherein:
the handle table comprises a plurality of handles that include file handles and non-file resource handles;
scanning the handle table of the process to identify the file names of the files currently open for the process comprises scanning the handle table to determine which of the plurality of handles are the file handles; and
identifying the file associated with the displayed application window further comprises resolving the file handles to the names of the files currently open for the process after performing the scanning.

17. A computing apparatus comprising:
a memory to store instructions for a data loss prevention agent; and
a processing device to execute the instructions, wherein the instructions cause the processing device to:
detect a command to perform a print screen operation;
identify a file associated with a displayed application window, wherein to identify the file the processing device:
scans a handle table of a process associated with the displayed application window to identify file names of a plurality of files currently open for the process, wherein a first file of the plurality of files contains confidential information and a second file of the plurality of files does not contain the confidential information; and
compares a title of the displayed application window to the file names of the plurality of files to determine which of the files is associated with the displayed application window; and
perform an action to enforce a data loss prevention policy responsive to determining that the displayed application window is associated with the first file containing the confidential information.

18. The computing apparatus of claim 17, wherein the action prevents the print screen operation, and wherein the instructions further cause the processing device to perform the print screen operation responsive to determining that the displayed application window is associated with the second file not containing the confidential information.

19. The computing apparatus of claim 17, wherein the displayed application window is one of a plurality of open application windows, further comprising the instructions to cause the processing device to perform the following for each open application window of the plurality of open application windows that meets a criterion:
determine whether the open application window is visible on a display; and
if the open application window is visible on the display, identify an additional file associated with the open application window and determine whether the additional file associated with the open application window contains confidential information.

20. The computing apparatus of claim 19, wherein the plurality of open application windows are ordered from front to back, and wherein the criterion is satisfied if any previous open application window in the order is not maximized.

21. The computing apparatus of claim 19, wherein:
the handle table comprises a plurality of handles that include file handles and non-file resource handles;
scanning the handle table of the process to identify the file names of the files currently open for the process comprises scanning the handle table to determine which of the plurality of handles are the file handles; and
identifying the file associated with the displayed application window further comprises resolving the file handles to the names of the files currently open for the process after performing the scanning.

* * * * *